(12) United States Patent
Ben Bakir et al.

(10) Patent No.: US 8,238,704 B2
(45) Date of Patent: Aug. 7, 2012

(54) LIGHT COUPLER BETWEEN AN OPTICAL FIBER AND A WAVEGUIDE MADE ON AN SOI SUBSTRATE

(75) Inventors: Badhise Ben Bakir, Grenoble (FR); Jean-Marc Fedeli, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 222 days.

(21) Appl. No.: 12/569,417

(22) Filed: Sep. 29, 2009

(65) Prior Publication Data

US 2010/0086256 A1 Apr. 8, 2010

(30) Foreign Application Priority Data

Sep. 30, 2008 (FR) ...................................... 08 56578

(51) Int. Cl.
*G02B 6/30* (2006.01)
*G02B 6/26* (2006.01)
*H01L 21/00* (2006.01)
*C23F 1/00* (2006.01)

(52) U.S. Cl. .............. 385/49; 385/43; 385/129; 385/50; 438/31; 216/24; 977/721; 977/932

(58) Field of Classification Search .................. 395/31, 395/43, 42, 129, 130, 131, 132, 49, 50, 14; 438/31; 216/24; 977/721, 932
See application file for complete search history.

(56) References Cited

U.S. PATENT DOCUMENTS

| | | | | |
|---|---|---|---|---|
| 6,853,775 B2* | 2/2005 | Payne | .............................. | 385/43 |
| 7,274,835 B2* | 9/2007 | Panepucci et al. | .............. | 385/12 |
| 2004/0057667 A1 | 3/2004 | Yamada et al. | .................. | 385/43 |
| 2004/0071403 A1* | 4/2004 | Lipson et al. | .................... | 385/43 |
| 2004/0202440 A1* | 10/2004 | Gothoskar et al. | ............. | 385/129 |
| 2005/0180678 A1* | 8/2005 | Panepucci et al. | .............. | 385/13 |
| 2006/0018601 A1* | 1/2006 | Lipson et al. | .................... | 385/43 |
| 2010/0086256 A1* | 4/2010 | Ben Bakir et al. | .............. | 385/49 |

FOREIGN PATENT DOCUMENTS

EP 1 400 822 A2 3/2004

OTHER PUBLICATIONS

Koji Yamada, et al., "Silicon Wire Waveguiding System: Fundamental Characteristics and Applications", Electronics and Communications in Japan, Part 2, vol. 89. No. 3, XP002529013, 2006, pp. 42-55.

* cited by examiner

*Primary Examiner* — Brian Healy
(74) *Attorney, Agent, or Firm* — Oblon, Spivak, McClelland, Maier & Neustadt, L.L.P.

(57) ABSTRACT

A light coupler between an optical fiber (6) and a waveguide is made on a semiconductor-on-insulator substrate (1), this substrate (1) comprising a thin layer of semiconducting material in which the waveguide is made. The coupler comprises a light injector (5) and an adiabatic collector (4) made up with an inverted nanotip formed from the thin layer of semiconducting material. The injector (5) is formed on the insulator (3) and has a face (7) for receiving an end of the optical fiber (6). The adiabatic collector (4) has a cross-section which increases from a first end located on the side of said end of the optical fiber (6) right up to a second end which is connected to the waveguide, the injector (5) covering the adiabatic collector (4) and having a rib waveguide shape.

14 Claims, 8 Drawing Sheets

LIGHT COUPLER BETWEEN AN OPTICAL FIBER AND A WAVEGUIDE MADE ON AN SOI SUBSTRATE

TECHNICAL FIELD

Figure 1:
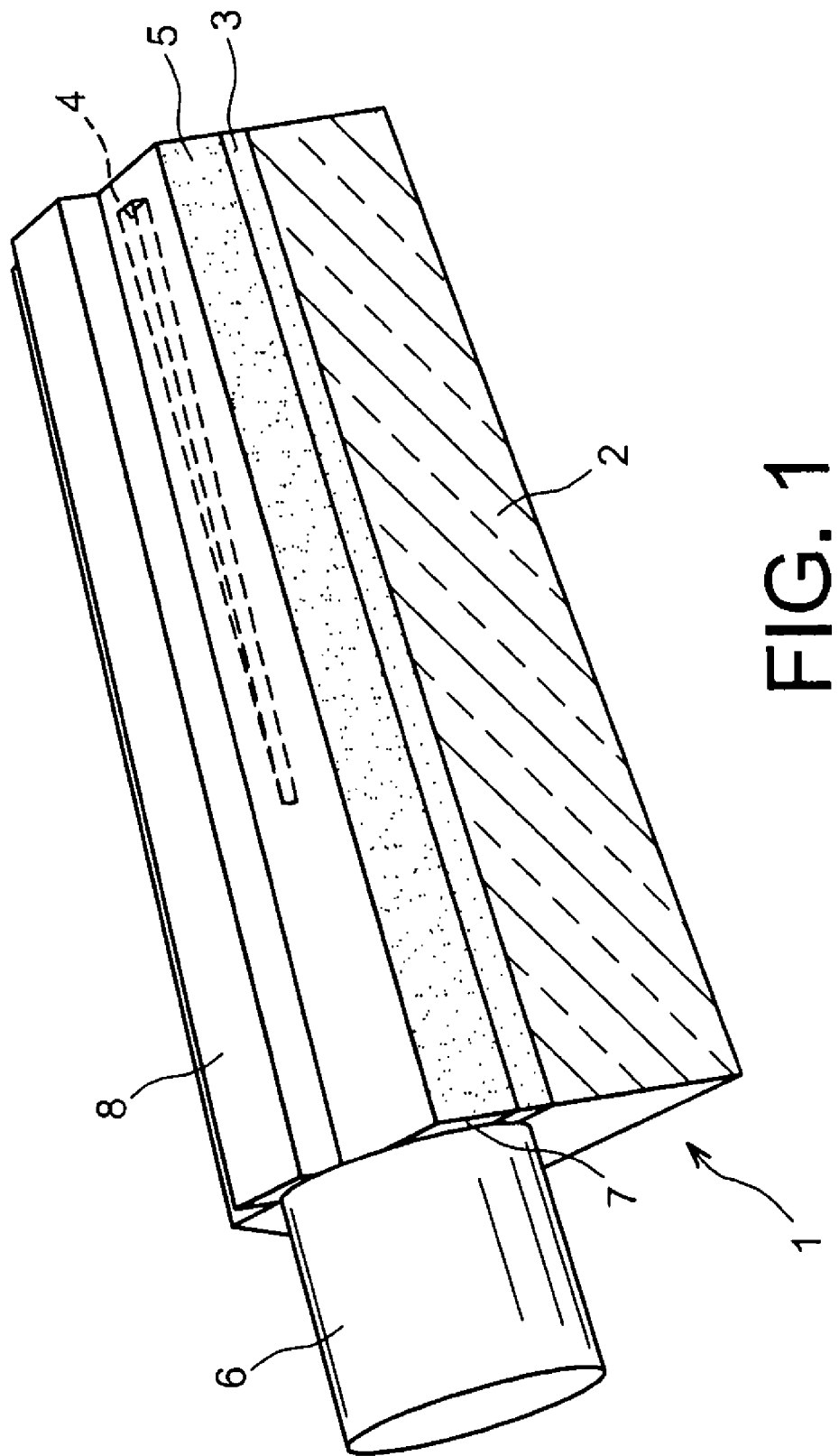

The invention relates to a light coupler between an optical fiber and a waveguide made on an SOI substrate. Such a light coupler finds applications in the field of optoelectronics and notably for nanophotonic circuits.

STATE OF THE PRIOR ART

Optoelectronic components made from microstructured or nanostructured planar optical guides allow the implementation of functions which are specific to them (resonator, wavelength multiplexer/demultiplexer, coupler, . . . ) and also with them it is possible to obtain effective coupling between an optical fiber for communication with external circuits.

Optoelectronic coupling components are notably involved in data transmission networks via optical fiber and in integrated (intra-chip and inter-chip) photonic circuits. Such a component may be considered as a basis brick of more complex devices.

With technologies of planar optical guides, it is possible to integrate in a compact way and on a same chip, complex functions for handling optical beams such as multiplexing, demultiplexing, modulation, spectral routing, etc. These functions may be both dedicated to optical links over a very short distance, of the scale of a millimeter (as in intra-chip communications) and over very long distances, of the order of several kilometers (such as a metropolitan network). Further, these optical functions will provide a solution to the problems related to the increase in the throughput of the interconnection buses.

The integration on a same chip with a high density of optical functions requires extensive miniaturisation of the photonic circuits, thereby reducing the section of the planar waveguides to submicron dimensions. Now, for medium and long distance applications (for example from a few meters to several kilometers), the preferential transport means is the optical fiber, for which the characteristic diameter remains high: from ten to a few tens of micrometers typically. In order to reach an optimum coupling level, the interfacing between both systems should therefore compensate this strong dimensional mismatch.

Another difficulty relates to polarisation of light: the optical signal circulating in fiber networks does not have any definite polarisation: it is a random quantity which continuously changes over time. On the other hand, a photonic integrated circuit is naturally very sensitive to polarisation. Indeed, an optical waveguide with an arbitrary shape ratio does not a priori propagate both states of polarisation of an optical signal at the same velocity (except if the section of the guide is strictly square). One then speaks of polarisation mode dispersion or equivalently of a birefringent optical waveguide. On reception, this sensitivity is incompatible with direct connection of the circuit to the network of optical fibers in which the state of polarisation is both unknown and unstable. Therefore one of the firstmost needs is to develop performing light couplers, i.e. with low loss level and insensitive to polarisation.

From the design point of view, a certain redundancy is found in the literature, the performed work essentially differing by the selection of the materials used. Two significant examples, which are different by technological and conceptual alternatives, are given below.

The document <<Polarization insensitive low-loss coupling technique between SOI waveguides and high mode field diameter single-mode fibers>> of J. V. GALAN et al., Optics Express, Vol. 15, No. 11, May 28, 2007, pages 7058-7065, discloses a coupler having an inverted nanotip positioned flush with the device. Injection of the light transported by the optical fiber is achieved by means of a widely proven V-groove type technique. The best calculated coupling rates however remain high, of the order of 3.5 dB and in a relatively reduced spectral range (about 100 nm).

The document <<Efficient silicon-on-insulator fiber coupler fabricated using 248-nm-deep UV lithography>> of G. ROELKENS et al., IEEE Photonics Technology Letters, Vol. 17, No. 12, December 2005, pages 2613-2615 proposes a different approach. A guide with a square section in polymer is superposed onto the nanotip. The major drawback of this approach is that the obtained device only operates for TE (transverse electric) polarisation and that the losses are quite high (typically −2 db). Another difficulty, also significant, relates to the encapsulation and reliability of the proposed structure. Further, the polymer does not retain its properties over time and under a strong light flux. It degrades while exhibiting strong increase of its absorption.

Document EP-A-1 400 822 describes a light coupler between an optical fiber and a waveguide. This coupler is made on an SOI substrate. It comprises a light injector and an adiabatic collector. The adiabatic collector is made up with an inverted nanotip formed from the thin layer of the SOI substrate. The injector covers the adiabatic collector and appears as a ribbon waveguide.

The document <<Silicon Wire Waveguiding System: Fundamental Characteristics and Applications>> of K. YAMADA et al., Electronics and Communications in Japan, Part 2, Vol. 89, No. 3, 2006 also describes such a coupler.

SUMMARY OF THE INVENTION

In order to find a remedy to the aforementioned drawbacks, the present invention proposes a light coupler with which light exiting an optical fiber may be coupled to a waveguide, for example in silicon, with a rectangular section (optionally square section) for two states of polarisation, TE and TM (Transverse Magnetic). It should be noted that the light may cover an opposite path, i.e. from the waveguide to the optical guide. One then will speak of a bidirectional coupler. The coupler consists of an injector, for example in $SiO_x$ (silica filled with silicon nanocrystals), and of an adiabatic collector which is an inverted nanotip in silicon.

The object of the invention is therefore a light coupler between an optical fiber and a waveguide made on a semiconductor-on-insulator substrate, the semiconductor-on-insulator substrate comprising a thin layer of semiconducting material in which the waveguide is made, the coupler being made on the semiconductor-on-insulator substrate, characterised in that it comprises a light injector and an adiabatic collector made up with an inverted nanotip formed from the thin layer of semiconducting material, the injector being formed on the insulator and having a face for receiving one end of the optical fiber, the adiabatic collector having a cross-section which increases from a first end located on the side of said end of the optical fiber up to a second end which connects to the waveguide, the injector covering the adiabatic collector and having a rib waveguide shape.

The rib of the waveguide forming the injector may have invariant width. According to another alternative embodiment, the rib of the waveguide forming the injector has an adiabatic shape, its width decreasing from its face for receiving the end of the optical fiber. According to an alternative embodiment, the width of the rib of the waveguide forming the injector decreases linearly.

According to an alternative embodiment, the width of the nanotip forming the collector decreases from its second end in a way selected from a linear decrease, a polynomial decrease and an exponential decrease.

According to an alternative embodiment, the coupler includes an encapsulation layer in an electrically insulating material, for example a layer of silicon oxide.

The collector may be in a material selected from silicon, InP and GaAs.

The injector may be in a material selected from silica filled with silicon nanocrystals, silicon nitride filled with silicon nanocrystals, and SiON either filled with silicon nanocrystals or not.

Advantageously, the semiconductor-on-insulator substrate is a silicon-on-insulator substrate. The silicon-on-insulator substrate may then comprise a support successively supporting a layer of silicon oxide and a thin silicon layer.

The object of the invention is also a method for making a light coupler between an optical fiber and a waveguide made on a semiconductor-on-insulator substrate, the semiconductor-on-insulator substrate comprising a thin layer of semiconducting material in which the waveguide is made, the coupler being made on the semiconductor-on-insulator substrate, the method comprising the following steps:

making in the thin layer, an adiabatic collector as an inverted nanotip, by etching the thin layer until the insulator is reached, depositing, on the etched thin layer, a layer of a material intended to form a light injector, making, in said material layer, the light injector as a rib waveguide covering the adiabatic collector.

SHORT DESCRIPTION OF THE DRAWINGS

Figure 2A:
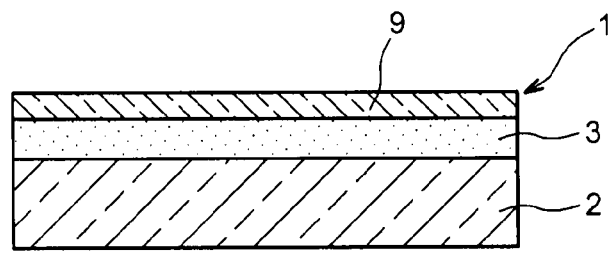
Figure 2B:
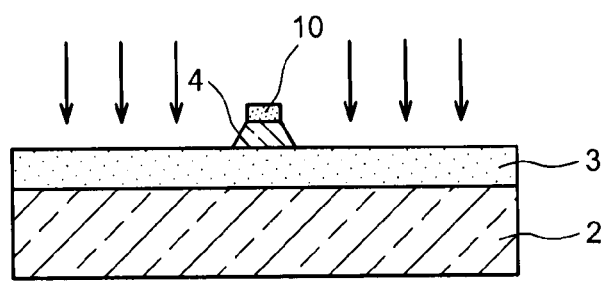
Figure 2C:
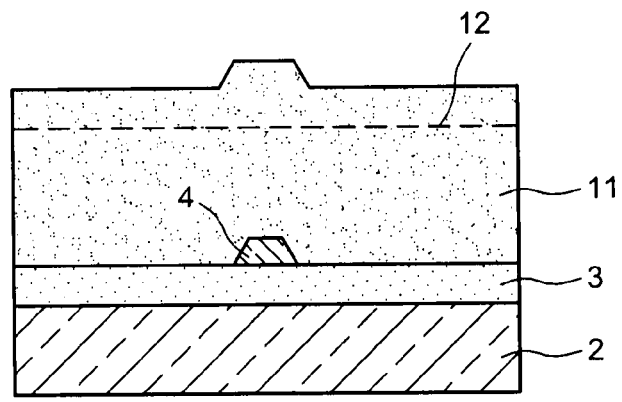
Figure 2D:
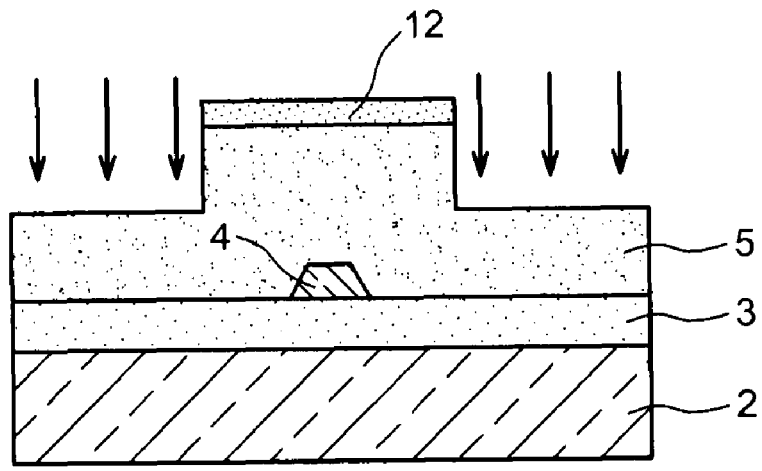
Figure 2E:
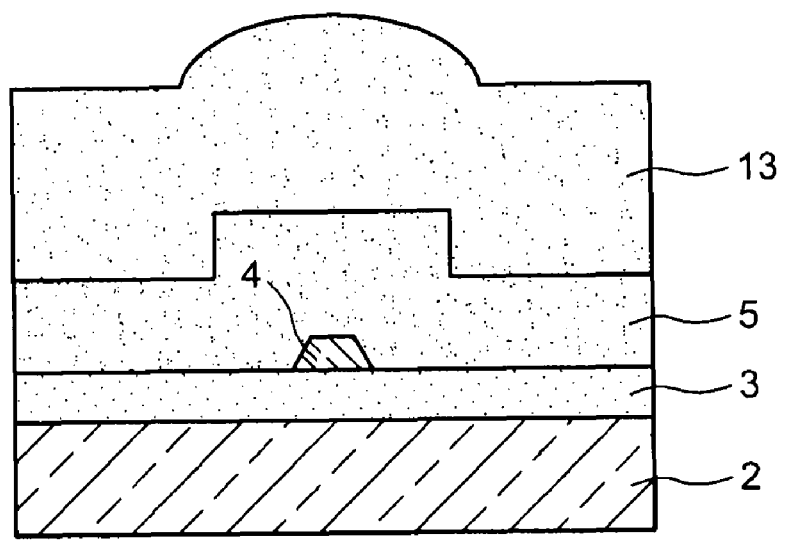
Figure 2F:
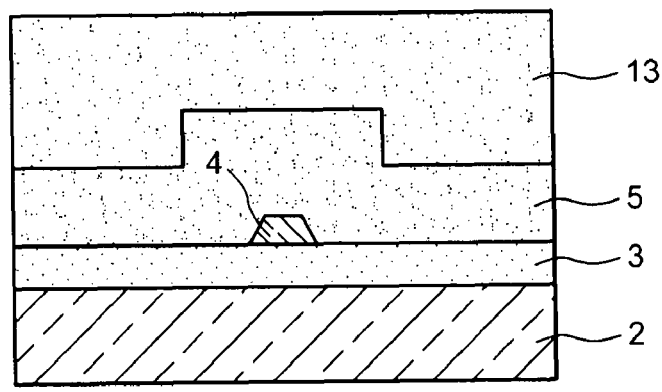
Figure 3A:
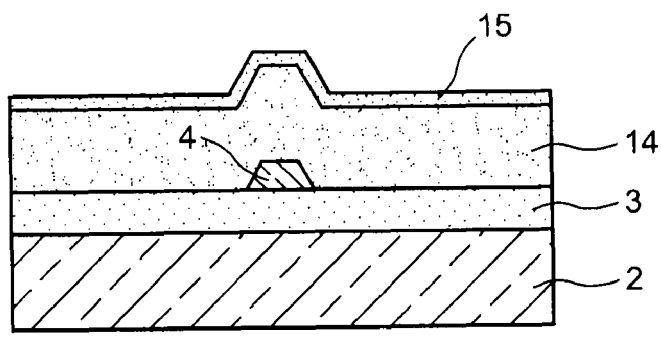
Figure 3B:
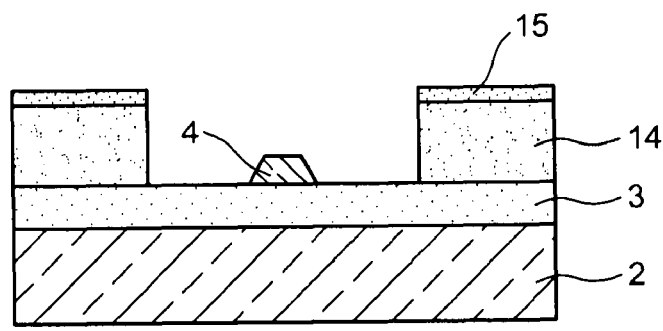
Figure 3C:
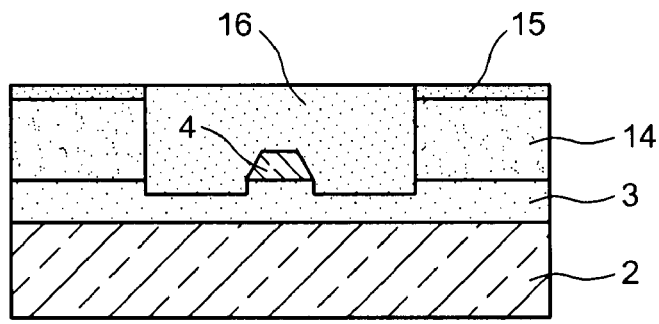
Figure 3D:
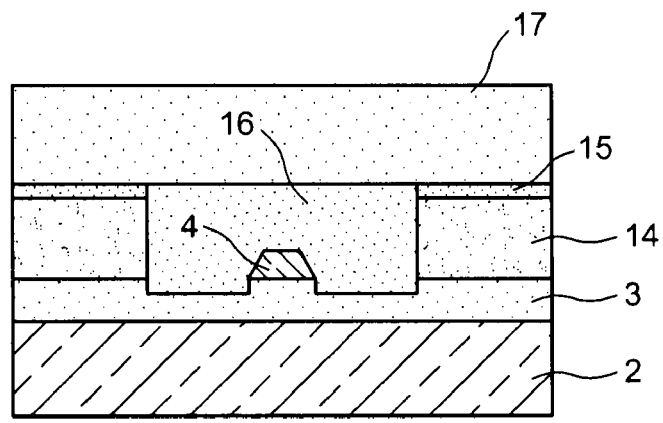
Figure 4:
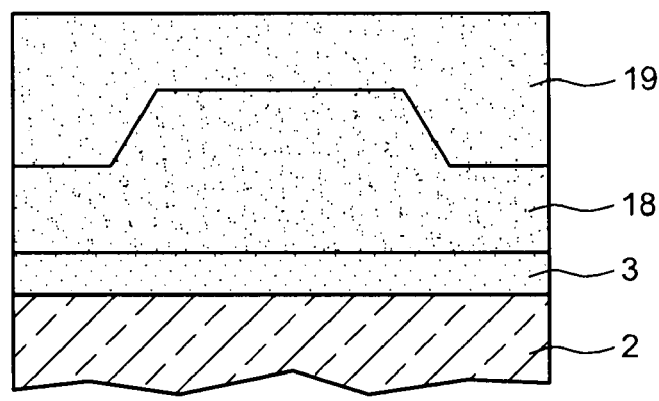
Figure 5:
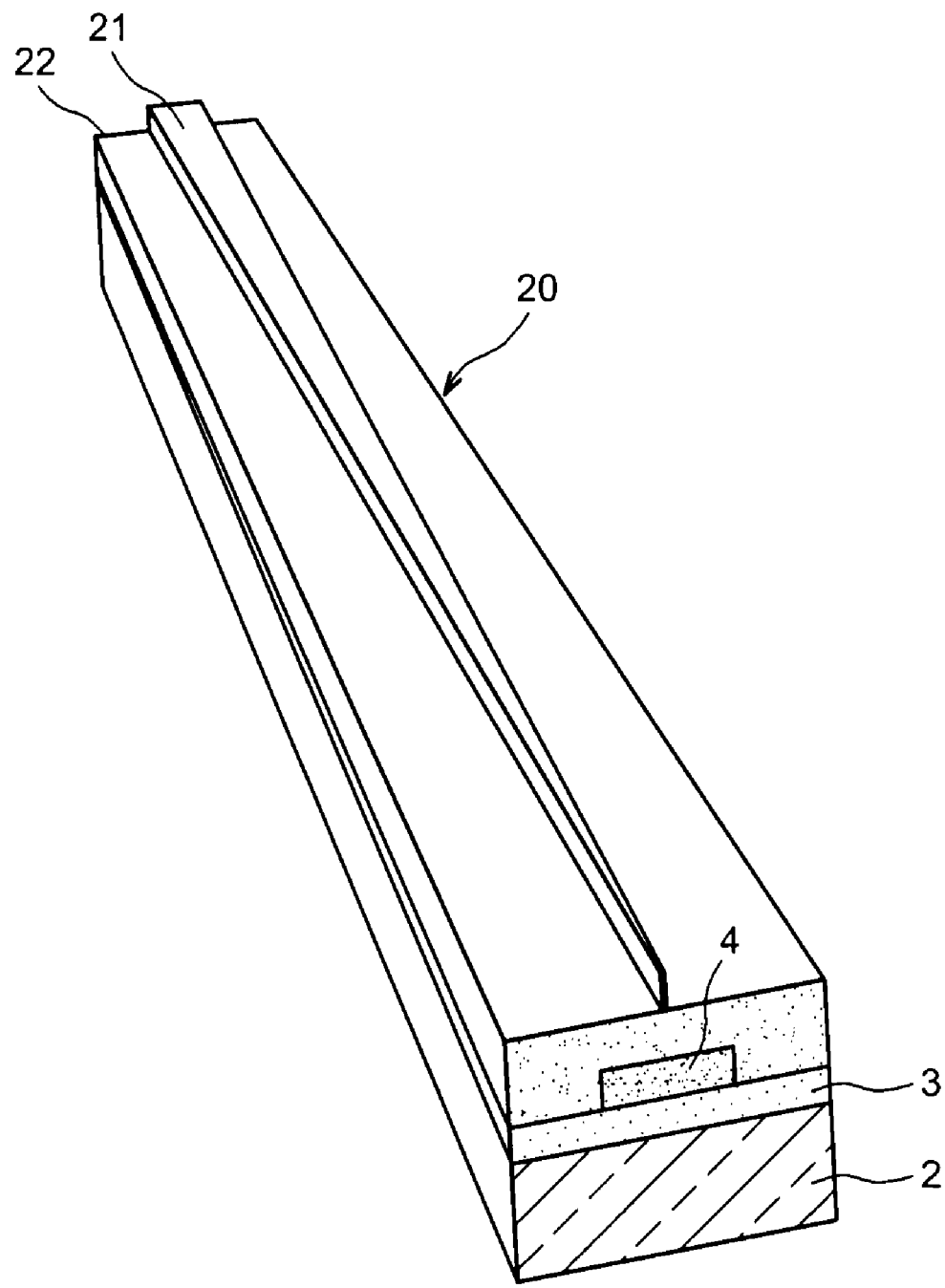
Figure 9:
Figure 10:
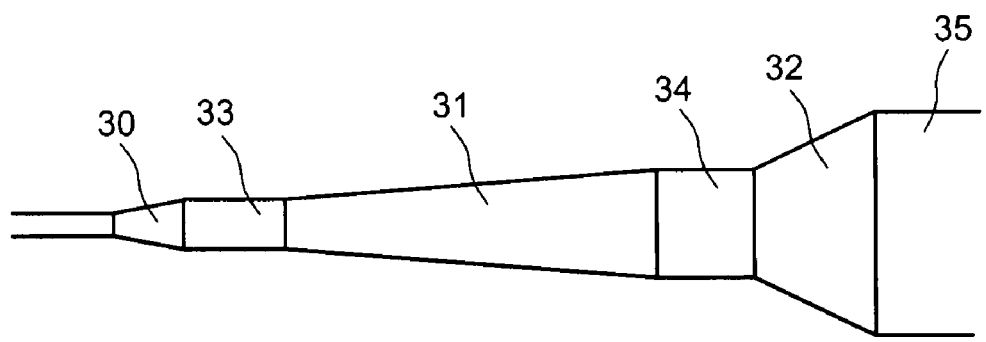
Figure 11:
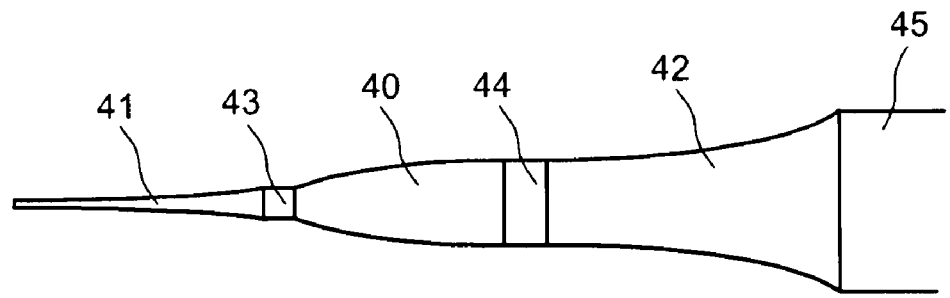

The invention will be better understood and other advantages and particularities will become apparent upon reading the description which follows, given as a non-limiting example, accompanied by the appended drawings wherein:

FIG. 1 is a perspective view of a light coupler according to the present invention, FIGS. 2A-2F illustrate a first embodiment of a light coupler according to the present invention, FIGS. 3A-3D illustrate a second embodiment of a light coupler, FIG. 4 is a transverse sectional view showing an injector which may be used for a light coupler according to the present invention, FIG. 5 is a perspective view of an adiabatic injector which may be used for a light coupler according to the present invention, FIGS. 6-9 show different possible shapes, as seen from above, for an adiabatic collector according to the present invention, FIGS. 10 and 11 show other possible shapes, as seen from above, for an adiabatic collector according to the present invention.

DETAILED DESCRIPTION OF PARTICULAR EMBODIMENTS OF THE PRESENT INVENTION

The injector has a very specific shape. The latter has a geometry of the rib guide type. The collector is always positioned downstream from the injector. Advantageously, the nanotip has an initial width of less than the tenth of the minimum operating wavelength in order to avoid problems related to diffraction of the optical mode. The coupling of the injected mode is accomplished gradually as the width of the collector increases until it attains that of the waveguide.

In the following of the description, embodiments implemented on an SOI substrate will be described.

FIG. 1 is a perspective, partly sectional view of a light coupler according to the present invention. The coupler is made on an SOI substrate 1. The substrate 1 comprises a support 2, for example in silicon, successively supporting a silicon oxide layer 3, called a buried oxide layer or BOX and with an optical index of 1.45, and a thin silicon layer.

The waveguide is made on the SOI substrate 1. The thin silicon layer is, in a way known to one skilled in the art, etched in order to form the waveguide. As an example, the waveguide may have a width of about 500 nm and a thickness of about 200 nm. The collector 4 is formed by tapering the end of the waveguide to be connected down to a width of less than 100 nm by DUV-193 nm lithography. The variation of the width of the collector 4 (or nanotip), a linear variation in the case of FIG. 1, is achieved over a length of a few hundred μm. A thick layer of silica filled with silicon nanocrystals ($SiO_x$) and with an optical index of about 1.5 is deposited, and then structured in order to define an injector 5 with a low index contrast for the optical fiber 6 having a core of 10 μm, placed in abutment on the receiving face 7 of the injector 5. The injector is a waveguide having a rib 8.

The modeling results show that the optical mode of the fiber penetrates without any difficulty into the injector portion of the device. This <<smooth>> transition is ensured by means of the shape ratios and similar index contrasts. Next, the mode is gradually coupled and evanescently, to the silicon guide as its section and its effective index increase. Simulations show coupling efficiencies above 90% over a wide spectral range for the two states of polarisation. It should be noted that this design is very robust towards the hasards of the manufacturing processes.

FIGS. 2A-2F illustrate an embodiment of a light coupler according to the present invention. These figures show the injector and the collector in a transverse sectional view. In this embodiment, the injector has a rib geometry.

FIG. 2A shows the substrate 1 consisting of the silicon support 2, of the buried oxide layer 3 (for example with a thickness of 2 μm) and of the thin silicon layer 9 (for example with a thickness of 220 nm). The substrate 1 may be a substrate of 220 nm.

FIG. 2B illustrates the definition of the inverted nanotip.

A hard mask is first deposited on the thin silicon layer 9. This hard mask may typically have a thickness of 100 nm. A resin layer is then deposited on the hard mask. It is then proceeded with lithography of the resin by the so-called <<deep-UV>> technique. The hard mask is opened by dry etching and the thin silicon layer is etched as far as the buried oxide layer 3 in order to obtain the microtip 4. The remaining portion 10 of the hard mask is then removed by wet (chemical) etching.

FIG. 2C illustrates the first step for forming the injector. On the structure obtained earlier, a compliant deposition of silica filled with silicon nanocrystals 11 is carried out. The thickness of the silicon layer 11 may be comprised between 1 and 10 μm depending on the applications. Deposition may be accomplished by PECVD, evaporation, sputtering, LPCVD, etc. This silica deposit is then planarised by mechanochemical polishing, down to the level symbolised by the dotted line 12.

FIG. 2D illustrates the second step for forming the injector. For this, on the structure obtained earlier, a thick resin layer is deposited and the width of the etched injector is defined by means of <<deep-UV>> lithography. It is proceeded with partial dry etching of the $SiO_x$ layer 11. This step is illustrated in FIG. 2D which shows the $SiO_x$ injector 5 and the remaining resin layer 12. The layer 12 is then removed and it is proceeded with cleaning with an oxygen plasma.

On the obtained structure, a compliant silica deposit 13 is made as shown in FIG. 2E. The silica layer 13 is then planarised by mechanochemical polishing. The light coupler according to the invention is obtained as seen in the transverse sectional view in FIG. 2F.

FIGS. 3A-3D illustrate an embodiment of a light coupler having a ribbon geometry. These figures show the injector and the collector in a transverse sectional view.

This embodiment uses an SOI substrate such as the one illustrated by FIG. 2A. The inverted nanotip is defined in the same way as the one illustrated in FIG. 2B. As earlier, the remaining portion of the hard mask is removed.

Next, a compliant deposition of silicon oxide 14 is carried out. On the silicon oxide layer 14, a fine layer of silicon nitride 15, either SiN or $Si_3N_4$, is deposited depending on the stoichiometry conditions of the deposit. The thickness of the layer 15 may range from a few hundred nanometers to 1 μm. Deposition may be accomplished by PECVD, evaporation, sputtering, LPCVD, etc. The obtained structure is shown in FIG. 3A.

It is then proceeded with lithography of the injector. The silicon nitride layer 15 is etched either chemically or by dry etching of the reactive ionic type. Next, the silicon oxide layer 14 is in turn etched down to the buried oxide layer 3, either chemically or by dry etching of the reactive ionic type. The etching time is determined so as to stop etching on the buried oxide layer 3. The obtained structure is shown in FIG. 3B.

It is then proceeded with the deposition of a layer of silica filled with silicon nanocrystals as far as just above the silicon nitride layer 15. The layer of silica filled with silicon nanocrystals is planarised by mechanochemical polishing with stopping on the silicon nitride layer 15 which is a hard layer which is used as a stop for polishing. The injector 16 is obtained as shown by FIG. 3C. It is seen that a portion of the buried oxide layer 3 has been filled with silicon nanocrystals.

It is then proceeded with encapsulation of the injector 16 by depositing a thick silica layer 17 preferably achieved by PECVD. The obtained final structure is shown in FIG. 3D.

The light coupler according to the invention provides optimum coupling, insensitive to polarisation. With it, it is possible to reduce the bulkiness of the optical circuit. The technological approach is simple. The methods for making the described structure utilise so-called planar, therefore CMOS-compatible, technologies.

From the making point of view, the rib waveguide is obtained by means of partial etching (see FIGS. 2C and 2D). The advantage is that the collector guide does not <<see>> the etch. When the intention is to form an injector which has the shape of a ribbon guide, one passes through the steps illustrated in FIGS. 3A and 3B. In this case, a total etch is achieved and the collector sees the etch. This total etch has the major drawback of further etching the surface of the guide, which may cause rough patches and therefore lesser efficiency of the collector guide.

In the embodiment of the invention described above, the injector is in silica filled with silicon nanocrystals. However, the injector may be made in other materials such as nitrides or other oxides, for example nitrided silicas (SiON for example) either filled with silicon nanocrystals or not. The selected materials should retain contrast with sufficient low index relatively to the surrounding medium.

The flanks of the injector may be vertical as in FIG. 2F. They may also be oblique, depending on the type of etching used for defining it, as in FIG. 4 which is a transverse sectional view. In this figure, reference 18 designates the injector and reference 19 designates its encapsulation layer.

The injector may have several configurations along the optical propagation axis. A first approach consists of giving it invariant structuration along its length. This approach is illustrated in FIG. 1 where the width of the rib of the injector is constant along the optical propagation axis.

Another alternative consists of giving it an adiabatic structuration along this optical axis. FIG. 5 shows such a configuration. It shows an injector 20 formed by a rib optical guide. It is seen that the width of the rib 21 decreases linearly from its face 22 for receiving the end of an optical fiber.

The material in which the collector (or nanotip) is defined, may be based on (crystalline, amorphous) silicon either doped or not. Other materials with a high optical index such as the III-V compounds (InP, GaAs) may also be used in active photonic circuits (amplifiers, laser sources, modulators).

Figure 8:
Figure 7:
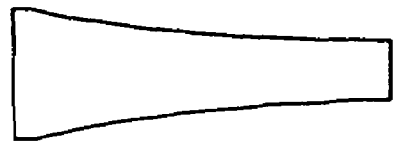
Figure 6:
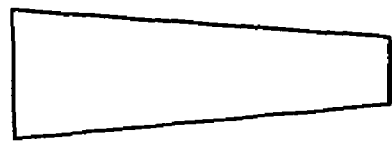

The width w of the nanotip may vary along the axis of propagation of light z as shown in FIGS. 6-9. FIG. 6 shows a decrease f(w) of the width of the nanotip which is linear with z. The variation of the width of the microtip may also be polynomial or exponential. FIG. 7 shows a decrease which is a function of $e^z$. FIG. 8 shows a decrease which is a function of $z^2$. FIG. 9 shows a decrease which is a function of $$\sum_n a_n z^z.$$

The collector may also be divided into several areas, each being defined by a pattern which is specific to it. These areas with a particular pattern are connected through connecting areas. FIGS. 10 and 11 show as seen from above, examples of such adiabatic collectors.

FIG. 10 shows a collector including three areas with a linear decrease of the type illustrated by FIG. 6: and entry area 30, an optimised collecting area 31 and an area 32 for exiting towards the waveguide 35. The areas 30 and 31 are connected through an area 33 with constant width. The areas 31 and 32 are connected through an area 34 with constant width.

FIG. 11 shows a collector including three areas with width variation: a central area 40 with a decrease of the type illustrated by FIG. 9, an entry area 41 and an area 42 for exiting towards the waveguide 45 with a decrease of the type illustrated by FIG. 7. The areas 41 and 40 are connected through an area 43 with constant width. The areas 40 and 42 are connected by an area 44 with constant width.

The invention claimed is:
1. A light coupler between an optical fiber and a waveguide, the light coupler comprising:
   a semiconductor-on-insulator substrate, the semiconductor-on-insulator substrate including
   a thin layer of semiconducting material in which the waveguide is disposed, the coupler being disposed on the semiconductor-on-insulator substrate;
   a light injector;
   a rib disposed on the light injector; and
   an adiabatic collector with an inverted nanotip including at least part of the thin layer of semiconducting material, wherein the light injector is disposed on the semiconductor-on-insulator and includes a face that receives an end of the optical fiber, the light injector covers the adiabatic collector, a width of the nanotip decreases from a second end which connects to the waveguide towards a first end that receives said end of the optical fiber, and a width of the rib decreases from the optical fiber towards the waveguide.

2. The light coupler according to claim 1, wherein the width of the rib decreases linearly.

3. The light coupler according to claim 1, wherein the width of the adiabatic collector decreases according to a linear function.

4. The light coupler according to claim 1, further comprising an encapsulation layer in an electrically insulating material.

5. The light coupler according to claim 4, wherein the encapsulation layer is in silicon oxide.

6. The light coupler according to claim 1, wherein the adiabatic collector is is either silicon, InP or GaAs.

7. The light coupler according to claim 1, wherein the light injector is silica filled with silicon nanocrystals, silicon nitride filled with silicon nanocrystals, or SiON.

8. The light coupler according to claim 1, wherein the semiconductor-on-insulator substrate is a silicon-on-insulator substrate.

9. The light coupler according to claim 8, wherein the silicon-on-insulator substrate comprises a support successively supporting a layer of silicon oxide and a thin silicon layer.

10. A method for making a light coupler between an optical fiber and a waveguide disposed on a semiconductor-on-insulator substrate, the semiconductor-on-insulator substrate comprising a thin layer of semiconducting material in which the waveguide is made, the light coupler being made on the semiconductor-on-insulator substrate, the method comprising:

making in the thin layer of semiconducting material, an adiabatic collector with an inverted nanotip, by etching the thin layer of semiconducting material until the semiconductor-on-insulator substrate is reached, forming a light injector by depositing a layer of a material on the semiconductor-on-insuator, and making, in said material layer, a waveguide with a rib covering the adiabatic collector, wherein a width of the nanotip decreases from a second end which connects to the waveguide towards a first end that receives said end of the optical fiber, and a width of the rib decreases from the optical fiber towards the waveguide.

11. The light coupler according to claim 1, wherein the width of the adiabatic collector decreases according to a ploynomial function.

12. The light coupler according to claim 1, wherein the width of the adiabatic collector decreases according to an exponential function.

13. The light coupler according to claim 7, wherein the light injector is SiON.

14. The light coupler according to claim 13, wherein the light injector of SiON is filled with silicon nanocrystals.

* * * * *